United States Patent Office 2,715,501
Patented Aug. 16, 1955

2,715,501

DRYING AND GRINDING OF TITANIFEROUS SLAGS

Ralph J. Magri, Jr., and Guy C. Marcot, Lynchburg, Va., assignors to American Cyanamid Company, New York, N. Y., a corporation of Maine No Drawing. Application January 25, 1954,
Serial No. 406,095

6 Claims. (Cl. 241—23)

The present invention relates to the continuous drying and grinding of moisture-containing titaniferous slags. More particularly, the present invention relates to continuous drying and grinding of moisture-containing titaniferous slags containing reduced titania while inhibiting conversion of the reduced titania therein to sulfuric acid-insoluble form.

It is present commercial practice to prepare titaniferous slags by smelting a ferro-titaniferous ore with carbon, coal, etc. The process takes place in an electric furnace wherein the ore is liquefied and a substantial part of the iron content thereof is reduced to the molten elementary state. The titaniferous phase floats on this iron and is tapped therefrom into molds, in which it is partly cooled.

Extensive fracturing takes place on ejection of the slag from the mold and on handling the slag as an incident to shipment, as a result of which the slag, as received by the consumer, consists predominantly of coarse particles and lumps.

Methods for the manufacture of slags of this type are disclosed in Peirce et al. U. S. Patent No. 2,476,453 and Cole Patent U. S. No. 2,631,941. Typically, these slags contain from 65% to 80% of titanium calculated as $TiO_2$. A substantial amount of this titanium is present in the form known as reduced titania, the amount typically being between 10% and 20% calculated as $TiO_2$.

This slag is produced on a large industrial scale. It is therefore necessarily stored both by the manufacturer and consumer in open piles, and is transported without protection from the weather. Moreover, it is customary to cool the slag from its molten condition by quenching the slag with water. On receipt by the consumer it is, therefore, almost always heavily laden and often is substantially saturated with water, the amount of water typically being from 3%–4% to 8% or more of the dry weight of the slag, depending principally upon prevailing weather conditions and the porosity of the slag.

In addition, it is known that titaniferous sinters may be prepared as shown in said Cole patent and by other means. Such sinters contain reduced titania and are equivalents of the slags referred to.

The bulk of the slag thus produced is consumed by the titanium pigment industry. The titanium values are recovered by a process which has as its first step the digestion of the slag with strong sulfuric acid. A digestion cake forms containing titanic sulfate. The cake is dissolved in water and dissolved titanium sulfate is hydrolyzed to form a precipitate of titanic hydrate which precipitates.

Efficient reaction of slag with sulfuric acid according to this method requires that the coarse, wet slag described above be comminuted to a particle size description such that at least 90%–95% of the slag is smaller than about 44 microns in average diameter for reasons explained in U. S. Patent No. 2,531,926 granted to Todd et al.

Before the slag can be ground as described it must be dried. One reason for this requirement is that in the absence of drying the sulfuric acid would be undesirably diluted by the entrained moisture. The principal reason for drying the slag, however, is that slag which contains even a few per cent of water cannot be ground to the necessary fineness.

When an attempt is made to grind coarse, wet slag particles in conventional apparatus including a hammer mill, rod mill, ball mill, or Raymond grinder, the slag is transformed into putty-like aggregates containing an excessively large proportion of oversize particles, that is, particles larger than 325 mesh. These oversize particles cannot be withdrawn by any practical means from the putty-like aggregates for further grinding, and when grinding of the aggregates is continued so that all the oversize particles are ground finer than 325 mesh, an excessively large number of undersize —10 micron particles forms. The digestion of slag containing a high proportion of —10 micron slag particles with strong sulfuric acid causes a reaction of explosive violence.

Slag shipped or stored out-of-doors under normal weather conditions contains more than 2% by weight of water and slag transported to the middle Atlantic States from the Trois Rivières region in Canada by rail typically holds 6%–8% of water by weight.

Both the titanium pigment and grinding arts recognize that before slag can be economically ground for efficient digestion with sulfuric acid as shown in the Todd et al. patent, the slag must first be dried to a moisture content of less than about 1.0% and that for most efficient grinding requires the slag should have a moisture content of about 0.1% or less.

Commercially, slag is dried and ground in a continuous operation, the slag being dried in a continuous rotary dryer and the discharge from the dryer being fed into a continuous grinder. This continuity eliminates the possibility of subsequent rewetting of the slag after it has been dried and before it has been ground.

Laboratory and plant scale studies have demonstrated that a substantial difference, often as much as 3%–6% or more, exists between the amount of titanium present in the slag and the amount of titanium solubilized when the digestion cake liquor is dissolved in water. It is still further known from analysis of residues that this loss of titanium values is due to failure of the titania content of the slag to react completely with the sulfuric acid.

In the recovery of titania values from slags a loss of as little as 0.5% of titania in this manner is of major economic importance.

Up to the present, it has been generally believed that a substantial proportion of this loss is due to a phase transformation of the anatase structure of the ore to rutile taking place when the slag is cooled following its formation. It has generally been believed that this transformation can be inhibited by rapidly cooling the slag to a temperature below this supposed phase transformation point.

The discovery has now been made, contrary to previous knowledge, that a substantial portion of the loss of titania values occurring in the manner described is due to the action of the oxygen content of air upon the reduced titania content of the slag at elevated temperature. It has been found that at an elevated temperature oxygen converts a proportion of the reduced titania of the slag to a rutile form which is insoluble in sulfuric acid, that is, when the slag is digested in normal manner with sulfuric acid of 85%–95% strength to form a titanium sulfate digestion cake.

The rapidity with which oxygen contained in air converts reduced titania to sulfuric acid-insoluble form is a function both of the temperature of the slag and its particle size. We have found that when the particle size of the slag is very coarse, that is, when about half of the slag particles are larger than about ⅛"–1/16" in largest dimension, the total amount of reduced titania converted to sulfuric acid-insoluble form at temperatures up to 175° C., is substantially nil in 20 minutes, but that very significant oxidation takes place when the temperature is raised to as little as 220° C.

We have further found, however, that when slag is finely ground, the rate at which the reduced titania is converted by oxygen to insoluble form increases rapidly. It has been found that significantly harmful oxidation takes place at temperatures as low as 150° C. The surprising discovery has been made that the action of oxygen is virtually nil with respect to such finely ground slag having a temperature below about 120° C.

In accordance with the present invention, therefore, before they are ground, the coarse slag particles are cooled from the normally high temperature at which they are discharged from the dryer to a temperature below which the harmful action of oxygen takes place, that is, below about 150° C. Preferably, according to the invention, the slag is cooled to a temperature below about 120° C. before it is admitted to the grinder. Moreover, the invention includes the step of drying the coarse slag at a temperature not in excess of 175° C. so as to substantially prevent oxidation during this step as well.

Normally, slag is dried at the present time by passing the coarse slag substantially as received in a continuous dryer in direct counter-current contact with a stream of hot combustion gases. The slag on discharge has a temperature of 150° C. and often very much more, the temperature of the combustion gases being very high. It is also customary to deliver this slag directly to a continuous ball mill provided with an air-classifying system, the amount of slag admitted to the dryer being regulated to equal the amount of slag discharged from the grinder. The contents of the grinder are therefore hot, and during grinding the slag is exposed for a substantial period of time to a temperature at which, we have found, a substantial amount of the reduced titania in the slag is converted to sulfuric acid-insoluble form.

The slag may be dried, cooled and ground by a wide variety of means according to the present invention. The step of cooling may be performed in any convenient manner so long as, of course, the slag is kept dry, and this may be performed by direct air-cooling, the amount of reduced titania oxidized in this manner being negligible.

Preferably, however, the coarse slag is dried in a horizontal rotary dryer in direct contact with combustion gases in counter-current flow, most advantageously the amount of oxygen therein being held to a minimum. The slag may be discharged at any convenient temperature normally used for drying, that is, up to about 350° C., but preferably is discharged in the range of 175° C. to 200° C., temperatures in this range insuring that the slag is dried with satisfactory rapidity while the dryer operates at good thermal efficiency. The slag is then cooled to below 150°–120° C. and is then passed into a continuous ball mill provided with a continuous return air-classifying system and ground to a particle size distribution such that it is rendered satisfactory for digestion with strong sulfuric acid.

The invention will be further illustrated by the examples which follow, which are to be construed as embodiments of the invention and not as limitations thereon.

Example 1

A coarse, wet titaniferous slag, predominantly of 2 to 10 mesh particles, containing 71.9% $TiO_2$, 8.9% FeO, 5.2% MgO, 6.2% $Al_2O_3$, 5.70% $SiO_2$, 0.52% of $V_2O_5$, and 6.1% of moisture, was dried under nitrogen until its water content was substantially nil, and cooled to room temperature. The slag was analyzed and was found to contain 18.8% of reduced titania by weight. The slag was ground at room temperature in a ball mill and screened, the 325 mesh fraction being retained.

A portion of the 325 mesh fraction was heated for 1 hour at the respective temperatures shown in the table below in a laboratory oven in shallow pans, access of air being permitted without use of forced ventilation. After the heating was completed the samples of slag were analyzed to determine the amount of reduced titania oxidized to sulfuric acid-insoluble form. Results were as follows:

| Sample No. | Oven Temp., °C. | Reduced Titania Oxidized To $H_2SO_4$- Insoluble Form, Percent |
|---|---|---|
| 1 | 150 | 2.6 |
| 2 | 200 | 19.1 |
| 3 | 300 | 35.8 |
| 4 | 400 | 97.5 |

This table shows that oxygen rapidly converts significant proportions of the reduced titania in slag to sulfuric acid-insoluble form, the rate of oxidation rising steeply as the temperature is raised.

A graph of these values on coordinate paper, when extrapolated, shows that below 120° C. the amount of reduced titania oxidized is substantially zero.

Example 2

A sample of a commercial shipment of slag corresponding to the slag of Example 1 was screened on receipt and was found to have the following particle size distribution:

| Mesh | Cumulative, Percent |
|---|---|
| +2½ | 17.0 |
| +4 | 39.0 |
| +8 | 54.0 |
| +14 | 63.0 |
| +65 | 84.0 |
| +200 | 94.0 |

This sample contained 7.0% water by weight.

1. The slag was conveyed to a continuous rotary oil-fired dryer operating at an exhaust gas temperature of 350° C. The slag was dried therein to a water content of 0.1% in direct counter-current contact with the hot combustion gases. The discharge temperature of the slag from the dryer was 220° C. The hot slag was fed into a continuous ball mill at the discharge end of which was an air-classifier which returned the oversize +325 mesh particles to the mill, the temperature of the slag entering the ball mill being 200° C.

Samples were simultaneously taken of the coarse slag fed to the dryer, the dried, coarse slag discharged from the dryer, and the finely ground slag discharged from the ball mill, and analyzed for reduced titania. Results were as follows:

| Sample | Percent of Reduced Titania in Slag | Percent of Reduced Titania Oxidized in Previous Step | Total [1] |
|---|---|---|---|
| Feed to dryer | 18.8 | | |
| Discharge from dryer | 18.4 | 2.1 | 2.1 |
| Discharge from ball mill | 16.6 | 9.8 | 11.7 |

[1] Based on initial weight of reduced titania in slag.

This table demonstrates that of the reduced titania remaining in the slag, the unsatisfactorily large amount of 9.8% was oxidized to sulfuric acid-insoluble form by the single step of grinding while hot, and that the significant amount of 2.1% was oxidized during the single step of drying. Calculations show that the amount of reduced titania rendered acid-insoluble by the action of the air during both grinding and drying was about 3% of the total of titania in the slag.

2. The foregoing procedure was modified by (1) decreasing the rate of fuel oil combustion to provide an exhaust gas temperature of 160° C., (2) retarding the rate of throughput of the dryer, so that the slag was dried to the same moisture content (0.1%), and (3) passing the dried slag through a holdup bin in which its temperature was reduced from 140° C. to 70° C. before the slag was fed to the ball mill.

Samples were taken simultaneously as before and analyzed with the following results:

| Sample | Percent of Reduced Titania in Slag | Percent of Reduced Titania Oxidized in Previous Step | Total [1] |
| --- | --- | --- | --- |
| Feed to dryer | 18.2 | | |
| Discharge from dryer | 18.2 | | |
| Discharge from ball mill | 17.8 | 2.2 | 2.2 |

[1] Based on initial weight of reduced titania in slag.

These results show that the loss of acid-solubilizable titania values was decreased from 11.7% to 2.2% or by 81% as a result of the modifications introduced into the drying and grinding process.

We claim:

1. A continuous method of preparing wet, coarse titaniferous slag particles for digestion with strong sulfuric acid, said particles having a substantial content of reduced titania and containing more than about 2% of water by weight, which comprises heating said particles to form particles sufficiently dry for grinding and having a temperature in excess of about 150° C., cooling said particles below about 120° C., and grinding said particles to a size such that at least 90% by weight thereof passes through the meshes of a standard 325 mesh screen.

2. A process according to claim 1 wherein the particles are dried by heating in counter-current contact with hot combustion gases.

3. A process according to claim 1 wherein the particles are dried to a water content of about 0.1% by weight.

4. A process according to claim 1 wherein the particles are heated during drying to a temperature between about 175° C. and 350° C.

5. A process according to claim 1 wherein the particles are ground to a particle size such that 80% by weight are between 10 and 30 microns in largest dimension.

6. A continuous method of preparing wet, coarse titaniferous slag particles for digestion with strong sulfuric acid, said particles having a substantial content of reduced titania and containing more than about 2% of water by weight, which comprises heating said particles to form particles sufficiently dry for grinding and having a temperature between about 150° C. and 175° C., cooling said particles below about 120° C., and grinding said particles to a size such that at least 90% by weight thereof passes through the meshes of a standard 325 mesh screen.

No references cited.